US007333811B2

(12) United States Patent
Liu

(10) Patent No.: US 7,333,811 B2
(45) Date of Patent: Feb. 19, 2008

(54) METHOD AND APPARATUS FOR UTILIZING HISTORICAL NETWORK INFORMATION FOR MITIGATING EXCESSIVE NETWORK UPDATES WHEN SELECTING A COMMUNICATIONS CHANNEL

(75) Inventor: Xin Liu, Waterloo (CA)

(73) Assignee: Research In Motion Limited, Waterloo (CA)

( * ) Notice: Subject to any disclaimer, the term of this patent is extended or adjusted under 35 U.S.C. 154(b) by 492 days.

(21) Appl. No.: 10/928,006

(22) Filed: Aug. 27, 2004

(65) Prior Publication Data

US 2006/0046723 A1    Mar. 2, 2006

(51) Int. Cl.
*H04Q 7/20* (2006.01)
(52) U.S. Cl. ............... 455/435.1; 455/435.2; 455/436; 455/437; 455/440
(58) Field of Classification Search ............ 455/435.1, 455/435.2, 436–440, 525
See application file for complete search history.

(56) References Cited

U.S. PATENT DOCUMENTS

| 5,822,696 | A | 10/1998 | Bergkvist | |
|---|---|---|---|---|
| 6,246,877 | B1 * | 6/2001 | Frodigh et al. | 455/436 |
| 7,016,680 | B2 * | 3/2006 | Yagi | 455/441 |
| 2002/0102977 | A1 | 8/2002 | Shi | |
| 2003/0045291 | A1 * | 3/2003 | Watanabe | 455/435 |
| 2004/0072565 | A1 * | 4/2004 | Nobukiyo et al. | 455/436 |
| 2004/0082328 | A1 * | 4/2004 | Japenga et al. | 455/436 |
| 2005/0037798 | A1 * | 2/2005 | Yamashita et al. | 455/525 |

FOREIGN PATENT DOCUMENTS

EP    1 229 754 A1    8/2002

OTHER PUBLICATIONS

European Search Report; European Patent Office; 2 pages.

* cited by examiner

*Primary Examiner*—Lester G. Kincaid
*Assistant Examiner*—Marisol Figueroa
(74) *Attorney, Agent, or Firm*—Danamraj & Emanuelson, P.C.

(57) ABSTRACT

A method and apparatus utilizing historical network information for mitigating excessive network updates when performing channel selection between a serving base transceiver station and an adjacent base transceiver station when determined channel selection would result in either a Location Area Update (LAU) or a Routing Area Update (RAU) is presented. If a network update, either LAU or RAU, is the first occurrence, network identification information for the LA or RA is stored and an incremental value indicating occurrence is set; else in the case occurrence is not the first, the incremental value is incremented. A first margin value is then selected if the incremented value does not meet or exceed a predetermined value, or a second margin value is selected if the incremented value does meet or exceed a predetermined value. The signal level of the adjacent base transceiver station is then compared to the reference signal level of the serving base transceiver station plus the selected margin value in order to determine channel selection.

15 Claims, 3 Drawing Sheets

METHOD AND APPARATUS FOR UTILIZING HISTORICAL NETWORK INFORMATION FOR MITIGATING EXCESSIVE NETWORK UPDATES WHEN SELECTING A COMMUNICATIONS CHANNEL

FIELD

The present invention relates, in general, to the field of Radio Resource Control (RRC) mechanisms in wireless communication networks, and, in particular, to a method and apparatus for selecting a communications channel.

BACKGROUND

In wireless communication networks, for example a Universal Mobile Telecommunications System (UMTS), communication channels may be created between: a mobile communications device for providing access to network services over radio communications channels; a Radio Access Network (RAN) comprising at least one radio base transceiver station for sending and receiving information over the communication channels and at least one radio network controller for controlling which communication channel over which radio base transceiver station a mobile communications device communicates and for routing the communications traffic; a core network comprising network nodes for providing network control features, such as billing and authentication, and routing communications traffic to and from the appropriate RAN and to and from other networks; and other networks, such as either a Public Switched Telephone Network (PSTN) or a Packet Data Network (PDN), for routing communications traffic to and from the core network. A mobile communications device may transition between base transceiver stations supported by the same radio network controller according to signal strength measurements received from each radio base transceiver station. A transition between radio base transceiver stations supported by the same radio network controller and further supported by the same core network only requires a radio interface update, and an interface update between the RNC and base transceiver station. However, a transition between radio network controllers supported by different core network requires a radio interface update, an interface update between the RNC and the base transceiver station, an interface update between the RNC and the core network; and a transition between core networks requires the additional interface update between the core network and either the PSTN or PDN.

When a mobile communications device transitions between RNC, the update is referred to a Routing Area Update (RAU). When a mobile communications device transitions between core networks, the update is referred to as a Location Area Update (LAU). The RAU and LAU require a much greater volume of signaling over the radio link than the interface update required when the mobile communications device transitions between base transceiver stations supported by the same radio network controller. Therefore, considering the limited resources and sensitive nature of the radio link, the interface updates required when transitioning between RNC and the core networks should be well controlled so as to prevent unnecessary power consumption and signaling over the radio interface. Because this occurs when the mobile communications device transitions between base transceiver stations supported by different RAN or core network, there is a potential the position of the mobile communications device and radio link conditions may result in frequent and unnecessary updates. This uncontrolled frequency can cause excess power consumption from the mobile communications device and excess traffic over the radio interface.

In order to mitigate excessive LAU and RAU, standard specification 3GPP 05.08 requires that a signal level from a serving base transceiver station compared against a signal level from an adjacent base transceiver station should be adjusted by a predetermined margin value in the case of a LAU or RAU. Adjusting the reference signal may in some circumstances prevent unnecessary updates from occurring, and, therefore, help reduce power consumption and improve radio link efficiency. For example, adjusting the reference signal may help prevent a mobile communications device positioned within an area in the network between two network cells served by two different radio base transceiver stations under certain propagation characteristics from unnecessarily switching between the two cells. However, due to the sensitivity of radio channels and therefore the unpredictable nature of radio channels, the same position at a different time may be under different propagation characteristics, or another position defined by different propagation characteristics, may not respond as well to the same adjusted value.

Therefore, there is a need to provide an improved method and of adjusting the reference signal level in order to mitigate excessive network updates.

SUMMARY

To overcome the limitations identified within the background, a method and apparatus are provided for selecting a communications channel.

In an embodiment, a channel selection mechanism utilizing channel selection history is presented for selecting a communication channel between a serving base transceiver station and an adjacent base transceiver station. The channel selection mechanism upon receiving a signal from the adjacent base transceiver station having a signal level meeting or exceeding a reference signal level from the serving base transceiver station determines if channel selection would result in either a location area update or a routing area update. If an update would occur, the channel selection mechanism determines if either an update of the same routing area or location area occurred previously. If an update with the same routing area or location area did not previously occur, an incremental value is set and identification information of the routing area or location area is stored. If a routing area update or a location area update did occur previously, the incremental value associated with the routing or location area information is incremented. The channel selection mechanism compares the incremented value to a predetermined value and either selects a first margin value if the incremented value does not meet or exceed the predetermined value, or selects a second margin value if the incremented value does meet or exceed a predetermined value. The channel selection mechanism then determines if the signal level of the adjacent base transceiver station meets or exceeds the signal level of the serving base transceiver station plus the selected margin value.

DETAILED DESCRIPTION

While the use and implementation of particular embodiments of the present invention are presented in detail below, it will be understood that the present invention provides many inventive concepts, which can be embodied in a wide variety of contexts. The specific embodiments discussed herein are merely illustrative of specific ways to make and use the invention and are not intended to limit the scope of the invention.

A channel selection mechanism of a communications device utilizing channel selection history in order to mitigate excessive network updates is presented. The communications device receives information over communication channels including network identification information and signal having signal strength from the adjacent base transceiver stations and compares the received signal strength against the signal strength of the serving base transceiver station. The channel selection mechanism is able to obtain from the information and the signal strength whether or not a Routing Area Update (RAU) or Location Area Update (LAU) is required. If either update is required, the network information associated with either or both, depending on the update required, the RAU or LAU is stored and either an incremental value is set or incremented depending on whether an update occurred previously. Depending on the value of the incremental value, the channel selection mechanism compares the signal strength against the signal strength of the serving base transceiver station plus either a first margin value or a second margin value in order to determine channel selection.

Figure 1:
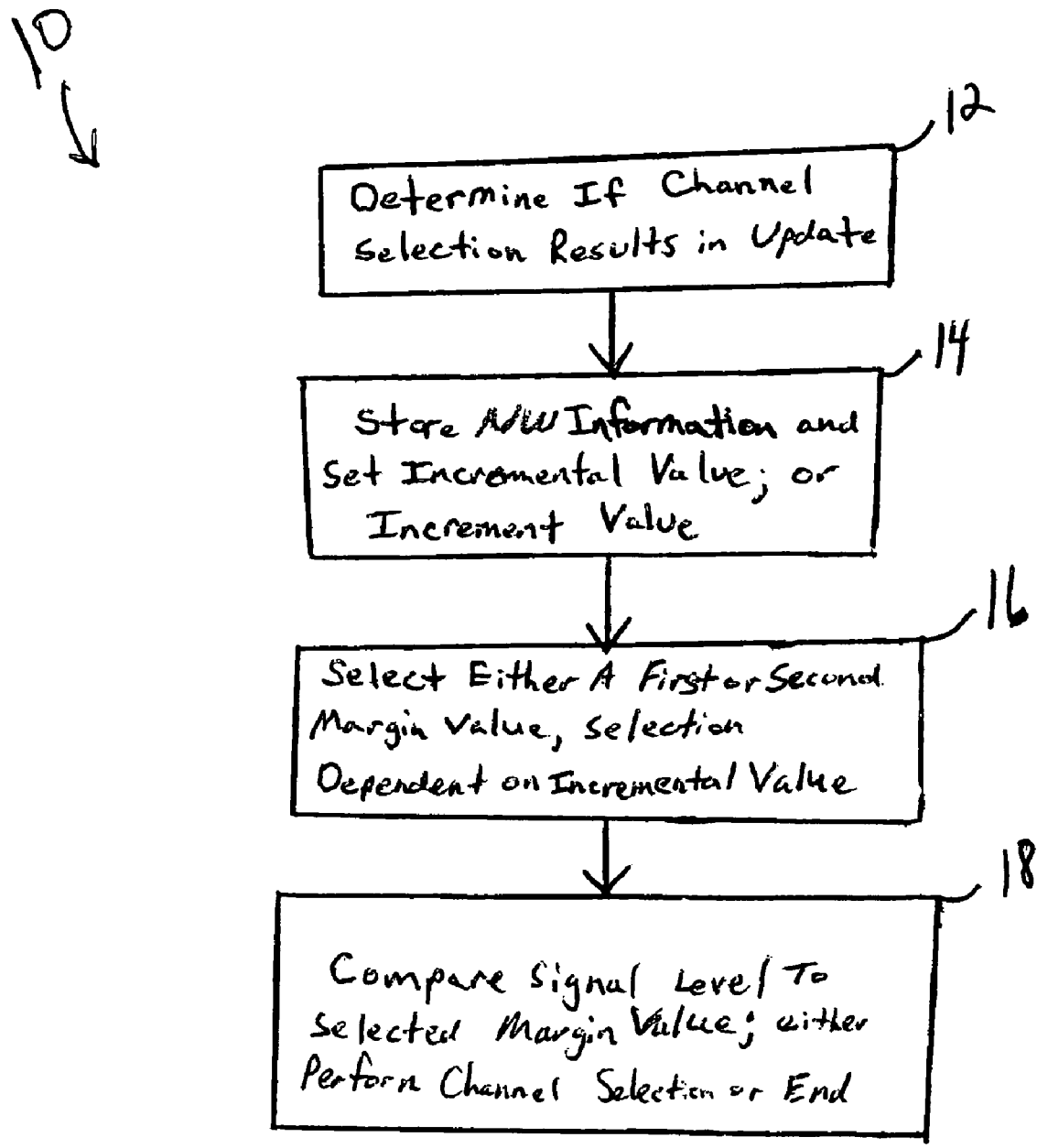
FIG. 1 illustrates procedural steps identifying a method of mitigating excessive network update utilized within a channel selection mechanism of a mobile communications device.

Referring to FIG. 1, procedural steps identifying a method of mitigating excessive network update utilized within a channel selection mechanism of a mobile communications device is illustrated and denoted generally as 10. At block 12, the channel selection mechanism receives information including network identification identifying location and routing areas and signals having signal level indicating signal strength from a base transceiver station adjacent to a serving base transceiver station providing communications service to the mobile communications device. The channel selection mechanism determines if the signal level received from the adjacent base transceiver station meets or exceeds the signal level, referred to herein as the reference signal level, of the serving base transceiver station. If the signal level does not meet or exceed the reference signal level, the channel selection procedure is terminated. If the signal level meets or exceeds the signal level of the serving base transceiver station, the channel selection mechanism determines from the network information if selecting the channel of the adjacent base transceiver station would result in a Location Area Update (LAU) or Routing Area Update (RAU). If channel selection would not result in a LAU or RAU, channel selection is performed. At block 14, if channel selection would result in a LAU or RAU, the channel selection mechanism determines if selection between either the same two areas occurred previously. If selection between either of the same two areas did not occur previously, channel selection mechanism stores the network identification information and sets an incremental value. If selection between either the same two areas occurred previously, the value is incremented. At block 16, the channel selection mechanism selects either a first predetermined margin value if the incremental value does not meet or exceed a predetermined limit or selects a second predetermined margin value, wherein the second margin value is greater than the first margin value, if the incremental value does meet or exceed a predetermined limit. At block 18, channel selection mechanism compares the received signal to the reference signal plus the selected margin value. If the received signal does not meet or exceed the reference signal plus the selected margin value, channel selection is not performed. If the received signal does meet or exceed the reference signal plus the selected margin value, channel selection is performed. The channel selection mechanism may remove identification information and associated incremental values gradually or completely if an update with a stored area has not occurred for a certain amount of time.

Figure 2:
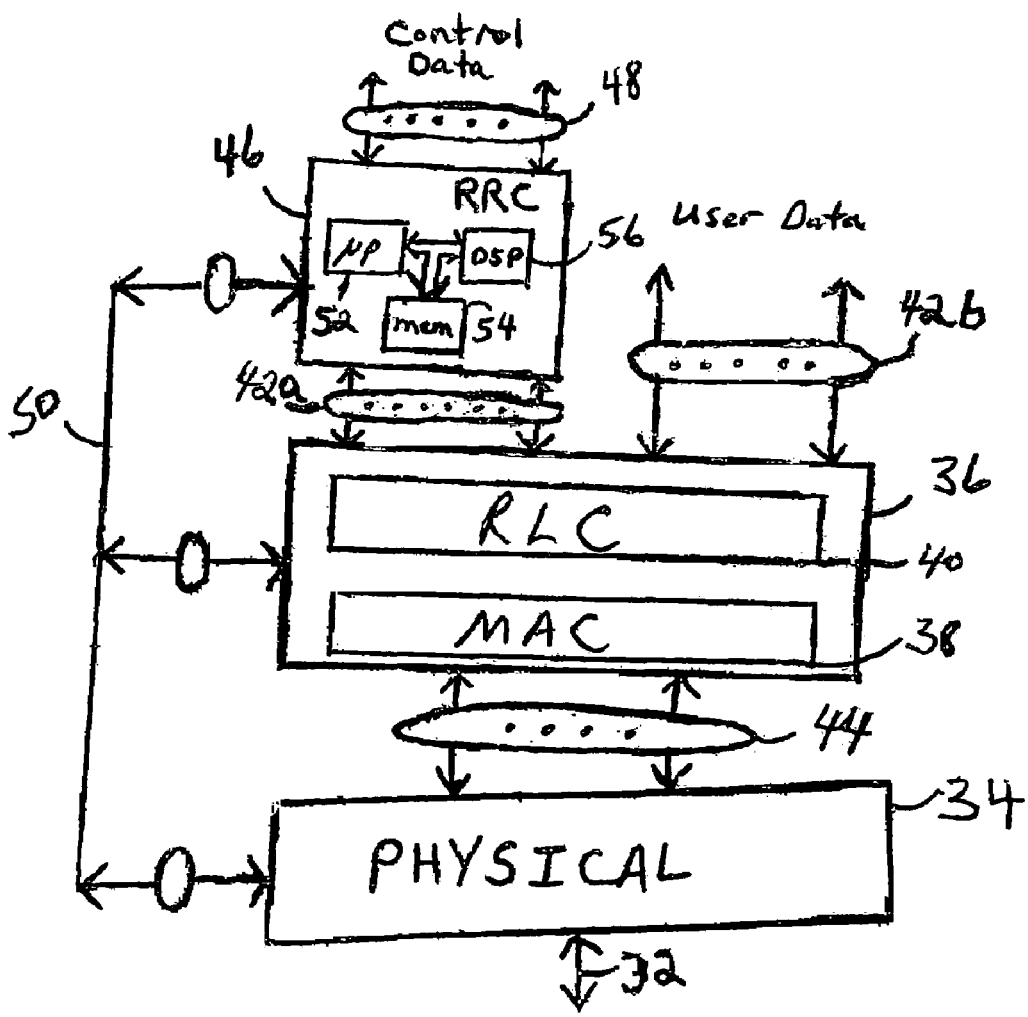
FIG. 2 illustrates relevant UMTS architecture of a mobile communications device utilizing the channel selection mechanism.

Referring to FIG. 2, illustrated is relevant GPRS, EDGE, or UMTS architecture of a mobile communications device utilizing the channel selection mechanism denoted generally as 30. The relevant architecture 30 comprises a radio channel 32 for connecting over a radio link to a base transceiver station, a physical layer mechanism 34 for generating the radio channel 32, a link layer mechanism 36 comprising a Medium Access Control (MAC) mechanism 38, and a Radio Link Control mechanism 40 for multiplexing and de-multiplexing control and user data to and from control and user data channels, 42a and 42b, and to and from transport channels 44, and a Radio Resource Control mechanism 46 for processing control data 42a, 48 and providing control information over control channel 50. Additional architecture and description is not provided since there are many different variations of mobile communications devices that the basic architecture of which would be known to someone of skill in the art. However, the mobile communications device may comprise, depending on the service supported, additional software components, such as IP, TCP, UPD, and RTP and applications layer software, such as email, internet search engines, and schedule and calendar software, in addition to various middleware components.

RRC mechanism 46 comprises a data processing mechanism for storing and processing data according to the processes identified within the description associated with FIG. 1. The data processing mechanism comprises a processor 52, a memory 54, and a Digital Signal Processor (DSP) 56, for receiving channel information, storing and processing the channel selection information, and executing the procedures and providing the control information necessary for channel selection. In the embodiment of the invention, the RRC mechanism 46 receives signal levels from serving and adjacent base transceiver stations, network identification information, and according to this information compares signal levels of adjacent base transceiver stations to either: the reference signal in the case no RAU or LAU is required; to the reference signal plus a first margin value in the case a RAU or LAU is required and the same RAU or LAU has not occurred previously a predetermined number of times; and to the reference signal plus a second margin value, wherein the second margin value is greater than the first margin value by a predetermined amount, in the case where either the same RAU or LAU occurred previously a predetermined number of time. Although FIG. 2 illustrates data processing mechanism encompassed within the RRC mechanism, it should be understood by one skilled in the art that the data processing mechanism may be a shared resource shared by other components within the architecture.

Figure 3:
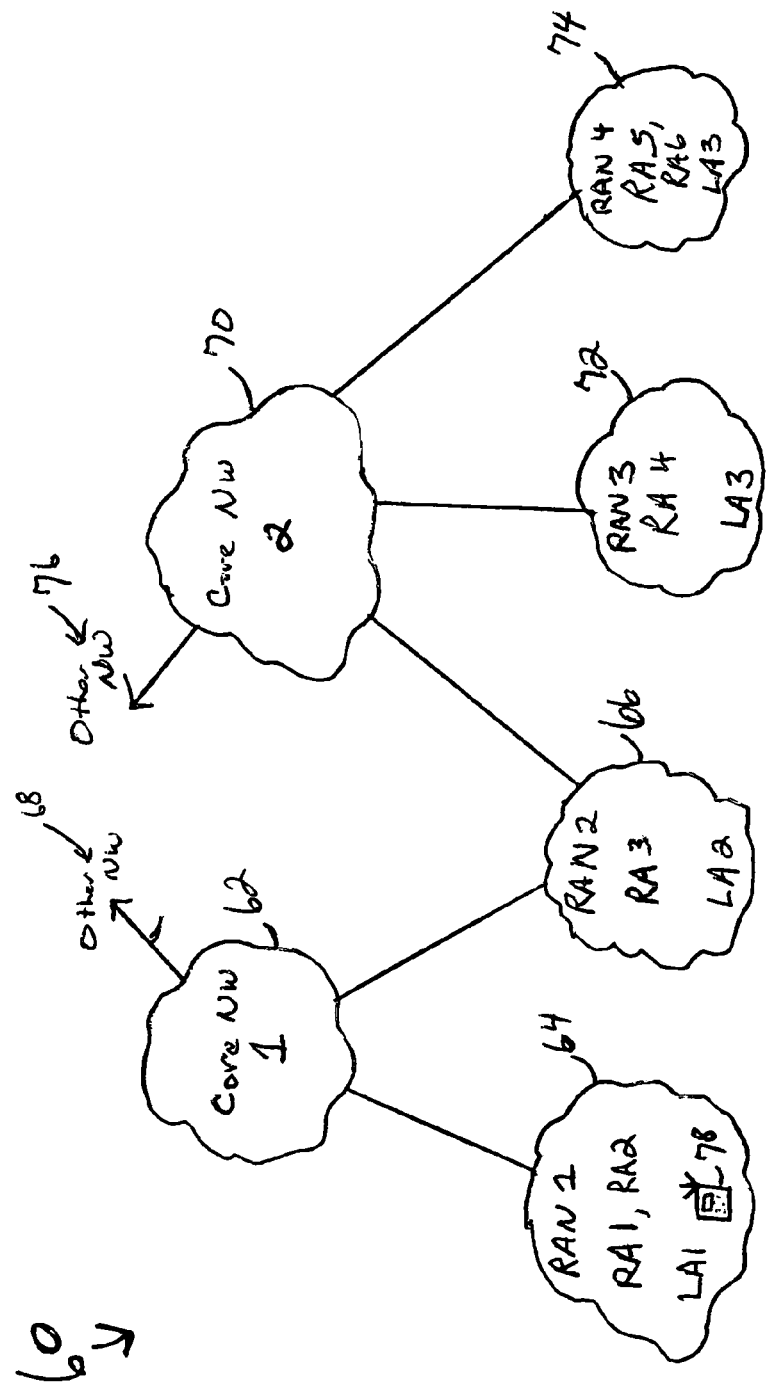
FIG. 3 illustrates a wireless communications network, for example a UMTS communications network, supporting communication services for a communications device utilizing the channel selection mechanism.

Referring now to FIG. 3, an exemplary wireless communications network, for example a GSM, GPRS or UMTS communications network adhering to appropriate standard specifications, supporting communication services for a mobile communications device utilizing the channel selection mechanism is illustrated and denoted generally as 60. The wireless communications network 60 comprises a core network 62 coupled to Radio Access Network (RAN) 64, 66 and to other networks 68, such as Public Switched Telephone Networks (PSTN) or Packet Data Networks (PDN). The wireless communications network further comprises core network 70 coupled to RAN 72, 74 and to other networks 76, such as a PSTN or PDN, and a mobile communications device 78. RAN 64, 66, 72, and 74 comprises multiples base transceiver stations providing a radio interface to the mobile communications device 78 and a radio network controller for assigning radio resources and directing communications over the base transceiver stations. In this illustration, RAN 64 comprises a network controller supporting two groups of base transceiver stations identified by RA1 and RA2 and further supported by one core network 62 identified by LA1. RAN 66 comprises a network controller supporting a group of base transceiver stations identified by RA3 and further supported by core network 62, 70 and identified by LA2. RAN 72 comprises a network controller supporting a group of base transceivers stations identified by RA4 and further supported by core network 70 identified by LA3. RAN 74 comprises a network controller supporting a group of base transceiver stations identified by RA5, RA6 and further supported by core network 70 identified also by LA3.

Communications traffic is routed to and from the mobile communications device 78, to and from RAN 64, and to and from core network 62, and other network 68 according to the RA and LA. As an example, in this particular illustration the mobile communications device 79 may be assigned LA1, RA1. Although not illustrated, in practice cell coverage between RAN will overlap one another. When mobile communications device 78 receives signal levels indicating that a transition between base transceiver stations should occur, the channel selection mechanism as described with reference to FIGS. 1 and 2 determine if channel selection would result in a RAU or LAU. If an update would occur, for example if channel selection would result in mobile station having LA1, RA2, the reference signal level of a serving base transceiver station plus a margin value is used to compare against the signal level of an adjacent base transceiver station if an update between RA1 and RA2 occurred previously a predetermined number of times. Therefore, channel selection history may be used to mitigate excessive network updates due to a combination of position and propagation characteristics.

While the use and implementation of particular embodiments of the present invention are presented in detail below, it will be understood that the present invention provides many inventive concepts, which can be embodied in a wide variety of contexts. The specific embodiments discussed herein are mere illustrations of specific ways for making and using the invention and are not intended to limit the scope of the invention.

The invention claimed is:

1. A method for selecting a communication channel for communications with either a serving base transceiver station or an adjacent base transceiver station, the method comprising the steps of:
   storing in a database network identification information and associated incremental values;
   identifying an incremental value, wherein the incremental value is associated with a number of network area updates that have occurred previously;
   selecting a first margin value when a stored incremental value is less than a predetermined value;
   selecting a second margin value when the incremental value is greater than or equal to a predetermined value;
   receiving from the serving base transceiver station a reference signal having a reference signal level;
   receiving from the adjacent base transceiver station an adjacent transceiver signal having an adjacent transceiver signal level; and
   selecting a communications channel with the adjacent base transceiver station and incrementing the incremental value when the adjacent transceiver signal level meets or exceeds a value equal to the reference signal level plus the selected margin value.

2. The method as recited in claim 1 further comprising the step of removing network information and associated values from the database gradually over time.

3. The method as recited in claim 1 further comprising the step of removing network information and associated values from the database completely when an update with a stored area has not occurred within a certain amount of time.

4. The method as recited in claim 1 wherein the network area update is a location area update.

5. The method as recited in claim 1 wherein the network area update is a routing area update.

6. A mobile communications device comprising:
   a memory for storing network identification information and associated incremental values; and
   a processor configured to:
   identify an incremental value, wherein the incremental value is associated with a number of network area updates that have occurred previously;
   select a first margin value when a stored incremental value is less than a predetermined value;
   select a second margin value when the incremental value is greater than or equal to a predetermined value;
   receive from a serving base transceiver station a reference signal having a reference signal level;
   receive from an adjacent base transceiver station an adjacent transceiver signal having an adjacent transceiver signal level; and
   select a communications channel with the adjacent base transceiver station and incrementing the incremental value when the adjacent transceiver signal level meets or exceeds a value equal to the reference signal level plus the selected margin value.

7. The mobile communication device as recited in claim 6 wherein the processor is further configured to remove from the memory network information and associated values gradually over time.

8. The mobile communication device as recited in claim 6 wherein the processor is further configured to remove from the memory network information and associated values related to a transceiver base station when an update related to that transceiver base station has not occurred within a certain amount of time.

9. The mobile communication device as recited in claim 6 wherein the network area update is a location area update.

10. The mobile communication device as recited in claim 6 wherein the network area update is a routing area update.

11. A computer-readable medium having program code stored thereon for execution by a mobile communication device configured to select a communications channel, the program code comprising:

a code segment for storing network identification information and associated incremental values in a memory;

a code segment for selecting a first margin value when a stored incremental value associated with the number of network area updates that have occurred previously is less than a predetermined value;

a code segment for selecting a second margin value when the incremental value associated with the number of network area updates that have occurred previously is greater than or equal to a predetermined value;

a code segment for receiving from a serving base transceiver station a reference signal having a reference signal level;

a code segment for receiving from an adjacent base transceiver station an adjacent transceiver signal having an adjacent transceiver signal level; and a code segment for selecting a communications channel with the adjacent base transceiver station and incrementing the incremental value when the adjacent transceiver signal level meets or exceeds a value equal to the reference signal level plus the selected margin value.

12. The computer-readable medium as recited in claim 11 further comprising a code segment for removing from the memory network information and associated values gradually over time.

13. The computer-readable medium as recited in claim 11 further comprising a code segment for removing from the memory network information and associated values related to a transceiver base station when an update related to that transceiver base station has not occurred within a certain amount of time.

14. The computer-readable medium as recited in claim 11 wherein the network area update is a location area update.

15. The computer-readable medium as recited in claim 11 wherein the network area update is a routing area update.

* * * * *